US008823873B2

(12) United States Patent
Liu et al.

(10) Patent No.: US 8,823,873 B2
(45) Date of Patent: Sep. 2, 2014

(54) METHOD AND DEVICE FOR CALCULATING BLUR IN VIDEO IMAGES

(75) Inventors: Debing Liu, Beijing (CN); Zhibo Chen, Beijing (CN); Xaiodong Gu, Beijing (CN); Feng Xu, Beijing (CN)

(73) Assignee: Thomson Licensing, Issy les Moulineaux (FR)

( * ) Notice: Subject to any disclaimer, the term of this patent is extended or adjusted under 35 U.S.C. 154(b) by 48 days.

(21) Appl. No.: 13/500,921

(22) PCT Filed: Oct. 10, 2009

(86) PCT No.: PCT/CN2009/001132
§ 371 (c)(1),
(2), (4) Date: Apr. 9, 2012

(87) PCT Pub. No.: WO2011/041922
PCT Pub. Date: Apr. 14, 2011

(65) Prior Publication Data
US 2012/0268652 A1     Oct. 25, 2012

(51) Int. Cl.
*H04N 7/01* (2006.01)
(52) U.S. Cl.
USPC ......................................................... 348/446
(58) Field of Classification Search
USPC ......... 348/446, 447, 448, 451, 452, 607, 614, 348/618; 375/240.01, 240.24, 240.26; 382/286, 302, 199
See application file for complete search history.

(56) References Cited

U.S. PATENT DOCUMENTS

| 5,153,711 | A | * | 10/1992 | DesJardins | 348/654 |
| 5,974,159 | A | * | 10/1999 | Lubin et al. | 382/106 |
| 5,982,942 | A | | 11/1999 | Hosokawa | |
| 6,229,913 | B1 | * | 5/2001 | Nayar et al. | 382/154 |
| 7,099,518 | B2 | * | 8/2006 | Li et al. | 382/255 |
| 7,257,273 | B2 | * | 8/2007 | Li et al. | 382/286 |
| 7,428,997 | B2 | * | 9/2008 | Wiklof et al. | 235/462.42 |
| 7,466,870 | B2 | * | 12/2008 | Hatalsky | 382/260 |
| 7,551,791 | B2 | | 6/2009 | Poon et al. | |
| 7,792,383 | B2 | * | 9/2010 | Hatalsky | 382/261 |
| 7,847,819 | B2 | * | 12/2010 | Oka | 348/125 |

(Continued)

FOREIGN PATENT DOCUMENTS

| CN | 1487749 | 4/2004 |
| CN | 1799079 | 7/2006 |

(Continued)

OTHER PUBLICATIONS

Search Report Dated Jul. 15, 2010.

(Continued)

*Primary Examiner* — Paulos M Natnael
(74) *Attorney, Agent, or Firm* — Tutunjian & Bitetto, P.C.

(57) ABSTRACT

Blur is one of the most important features related to image quality. Accurately estimating the blur level of an image is a great help to accurately evaluate its quality. A method for calculating blur of video images comprises calculating a horizontal blur value, and determining characteristic parameters of the video images, including at last progressive/interlaced and spatial resolution level. If the video images are progressive, also a vertical blur value is calculated, and combined with the horizontal blur value. The next step is normalizing the horizontal blur value, or the combined horizontal and vertical blur value, according to predefined min and max values, wherein the min and max values are adapted to the spatial resolution level.

8 Claims, 3 Drawing Sheets

(56) References Cited

U.S. PATENT DOCUMENTS

| | | | |
|---|---|---|---|
| 8,077,998 B2* | 12/2011 | Hunt | 382/264 |
| 8,164,632 B2* | 4/2012 | Enami et al. | 348/180 |
| 8,203,615 B2* | 6/2012 | Wang et al. | 348/208.4 |
| 8,330,827 B2* | 12/2012 | Wang | 348/222.1 |
| 2002/0101535 A1* | 8/2002 | Swan | 348/448 |
| 2004/0066981 A1* | 4/2004 | Li et al. | 382/286 |
| 2005/0105819 A1* | 5/2005 | Burch et al. | 382/264 |
| 2007/0024627 A1* | 2/2007 | Oka et al. | 345/474 |
| 2007/0145136 A1* | 6/2007 | Wiklof et al. | 235/454 |
| 2008/0137982 A1* | 6/2008 | Nakajima | 382/264 |
| 2011/0317768 A1* | 12/2011 | Liu et al. | 375/240.24 |

FOREIGN PATENT DOCUMENTS

| | | |
|---|---|---|
| CN | 101282481 | 10/2008 |
| EP | 0679032 | 10/1995 |
| EP | 1383344 | 1/2004 |
| JP | 5137046 | 6/1993 |
| JP | 7-296159 | 11/1995 |
| JP | 10011577 | 1/1998 |
| JP | 2006172417 | 6/2006 |
| JP | 2008-109545 | 5/2008 |
| WO | WO2005060272 | 6/2005 |

OTHER PUBLICATIONS

Debing et al. "No ReferenceBlock Based Blur Detection", Quality of Multimedia Experience. QOMEX, Jul. 29, 2009,IEEE, Piscataway, NJ, USA, pp. 75-80.

Patti et al. "Robust Methods for High-Quality Stills from Interlaced Video in the Presence of Dominant Motion", IEEE Transacfions on Circuits and Systems for Video Technology, vol. 7, No. 2, Apr. 1, 1997.

* cited by examiner

METHOD AND DEVICE FOR CALCULATING BLUR IN VIDEO IMAGES

This application claims the benefit, under 35 U.S.C. §365 of International Application PCT/CN2009/001132, filed Oct. 10, 2009, which was published in accordance with PCT Article 21(2) on Apr. 14, 2011 in English.

FIELD OF THE INVENTION

This invention relates to a method and an apparatus for determining and calculating blur in video images.

BACKGROUND

Blur is one of the most important features related to image quality. Accurately estimating the blur level of an image is a great help to accurately evaluate its quality. Various methods have been proposed to solve the problem, for example in "No-Reference Block Based Blur Detection"[1] by Debing Liu, Zhibo Chen, Huadong Ma, Feng Xu and Xiaodong Gu, or in "A no-reference perceptual blur metric"[2] by P. Marziliano, F. Dufaux, S. Winkler, and T. Ebrahimi, or in a similar patent application WO03/092306.

Proc. 2009 International Workshop on Quality of Multimedia Experience, pp. 75-80

Proc. of IEEE Int. Conf. on Image Processing, vol. 3, September 2002, pp. 57-60

All currently known blur detection schemes estimate the blur level of an image just from the information of the image itself. However, it is difficult to design a general blur detection scheme that has high performance for all kinds of blur. Blur detection is used for image quality determination or estimation, or before blur cancelling. For both, it is desirable to know what the source of the blur is. From images alone this is difficult or even impossible. Therefore general blur detection schemes are currently used. Because such general solution cannot take account of the specific blur types in different cases, its accuracy is not good.

SUMMARY OF THE INVENTION

It has been recognized that there are many kinds of blur, such as blur generated by H.264 coding or by MPEG-2 coding, and that different kinds of blur have different features. Blur detection and calculation may be influenced by many factors such as image resolution, coding configuration, codec type and blur type. Lack of the information of those factors will definitely influence the performance of blur detection. Some of those factors cannot be obtained or cannot be accurately estimated just from the image itself.

In this invention, we propose an improved, configurable blur detection and/or calculation scheme. In one aspect, blur detection and/or calculation is based on calculating a horizontal blur value, determining characteristic parameters of the video images and normalizing the blur value. If the video images are progressive, also a vertical blur value is calculated and combined with the horizontal blur value before the normalization. The improved blur value can be used for image quality determination or estimation, or as a control parameter for a blur cancelling algorithm.

In one embodiment, a user gives some configuration of characteristic factors at first, and then based on the user configuration an appropriate blur detection scheme is applied. In another embodiment, the characteristic factors are obtained from a video decoder directly. The additional information will largely improve the performance of blur detection.

For example, videos can be distinguished to be interlaced or progressive. There is much difference between them, and it improves blur determination and blur calculation to take account of these differences. One aspect of the invention is to use a specific blur detection scheme for interlaced video images, and a different specific blur detection scheme for progressive video images.

According to one aspect of the invention, a method for determining and/or calculating blur of video images comprises steps of calculating a horizontal blur value, determining characteristic parameters of the video images, including at last progressive/interlaced and spatial resolution level, if the video images are progressive, calculating also a vertical blur value and combining it with the horizontal blur value, and normalizing the horizontal blur value, or the combined horizontal and vertical blur value, according to predefined minimum (min) and maximum (max) values, wherein the minimum and maximum values are adapted to the spatial resolution level.

In one embodiment, the step of calculating a horizontal blur value is performed at least or only for image areas around the centers of vertical MB edges. In one embodiment, the step of calculating a vertical blur value is performed also for image areas around the centers of horizontal MB edges.

In one embodiment, the calculating a blur value comprises calculating a local variance around a current pixel.

In one embodiment, the local variance for the horizontal blur value is calculated from pixels on a vertical line and pixels on a horizontal line, wherein more pixels from the horizontal line than from the vertical line are used, and wherein said center of a horizontal MB edge is a member of both lines. In one embodiment, the current pixel is excluded from blur calculation if the local variance is above a maximum threshold or below a minimum threshold.

In one embodiment, one or more of the characteristic parameters of the video images are obtained through a user interface or from a memory after being input through a user interface. In one embodiment, one or more of the characteristic parameters of the video images are obtained through a machine interface from a video decoder. In one embodiment, one or more of the characteristic parameters of the video images are obtained through metadata associated with the video images. Different characteristic parameters may also be obtained from different of these sources.

According to another aspect of the invention, a computer program product comprises code for causing a computer to execute the above-described method.

According to another aspect of the invention, an apparatus for calculating blur of video images comprises means for calculating a horizontal blur value, means for determining characteristic parameters of the video images, including at last progressive/interlaced and spatial resolution level, means for calculating also a vertical blur value and combining it with the horizontal blur value if the video images are progressive, and means for normalizing the horizontal blur value, or the combined horizontal and vertical blur value, according to predefined min and max values, wherein the min and max values are adapted to the spatial resolution level.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 the process of configurable blur detection scheme.

DETAILED DESCRIPTION OF THE INVENTION

The present invention discloses a flexible and configurable blur detection and/or blur calculation scheme.

Figure 1:
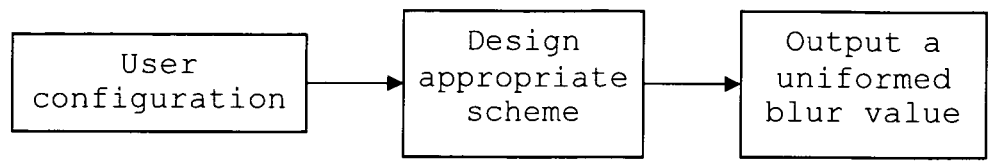

FIG. 1 generally illustrates a configurable blur detection process that contains three steps:

First, configuration data are obtained. These can be input by a user. For an image to be evaluated, the user may give characteristic parameters of the configuration to point out the scenario. The user configuration may be anything that influences the blur detection scheme, e.g. resolution, progressive or interlaced, codec type, coding configuration and blur type (compression blur, motion blur, out of focus blur, low-pass filter blur, up-sampling blur etc.). These characteristic parameters can be used alone or in any combination.

It is to be noted that the characteristic parameters can also be obtained from a memory after being input through a user interface, or through a machine interface from a video decoder and/or through metadata associated with the video images. In the latter case, a video decoder comprises means for extracting these metadata from a video signal and means for providing the metadata to a blur detector or calculator according to the invention.

Second, an appropriate blur detection scheme is selected automatically according to the configuration. The blur detection scheme is changed according to the configuration data mentioned above. The change may be a completely framework change, or it may be only an adjustment of some parameters. If no configuration is defined, the default blur detection scheme can be selected.

Third, a uniformed (or unified) blur value is output. The blur detection scheme works differently, according to the different configuration, which consequently influences the meaning of the calculated blur value. That is, blur values obtained from different blur detection and/or blur calculation schemes are not directly comparable. Therefore, according to the invention, they are unified or standardized into a unified format. In one embodiment, this can be obtained by scaling. For example, linear scaling is used. Other more sophisticated scaling types are also possible.

In one embodiment of the invention, the calculated blur value is scaled to a range of (0-100), wherein 0 means minimum blur and 100 means maximum blur. Alternatively, the scaling can be to a range of (0-1) or (0%-100%) or similar. The scaling rules may be different for different configurations.

The following is an exemplary embodiment of a configurable blur detection/calculation scheme. It has two configuration items that correspond to characteristic parameters: video format (with two options) and resolution (with two options).

The video format may be "progressive", wherein the images to be evaluated are from progressive videos, or "Others/not progressive", wherein the images to be evaluated are from interlaced videos, or it is unknown if the videos are progressive or interlaced.

The resolution may be "High resolution", e.g. higher than or equal to 1280×720 pixels, or "Other" (i.e. lower than 1280×720 pixels, such as SD, CIF, QCIF, etc.).

In one embodiment, the invention comprises using the user configuration to help the blur detection, i.e. to figure out the scenario. In this embodiment, the user configuration contains two items: video resolution (high resolution or others) and video format (progressive or other). There may also be other configurations, such as codec type (MPEG-2, H.264, JPEG, etc.), coding configuration, and blur type (motion blur, out of focus blur, compression blur, up-sampling blur, low-pass filter blur etc.). The user configuration may be input via textual interface, speech interface, memory interface, switch configuration etc.

In one embodiment, a blur detection/calculation scheme can be summarized as follows: According to configuration data (progressive or others, high resolution or other resolution type), an appropriate scheme is automatically selected and the related parameters are automatically set. Also according to the configuration data, different scaling rules are used to get a uniformed blur value.

An advantage of the invention is that with the additional configuration information, the accuracy of blur detection in a specific scenario can largely be improved, and therefore the scheme can be used in much more scenarios.

Figure 2:
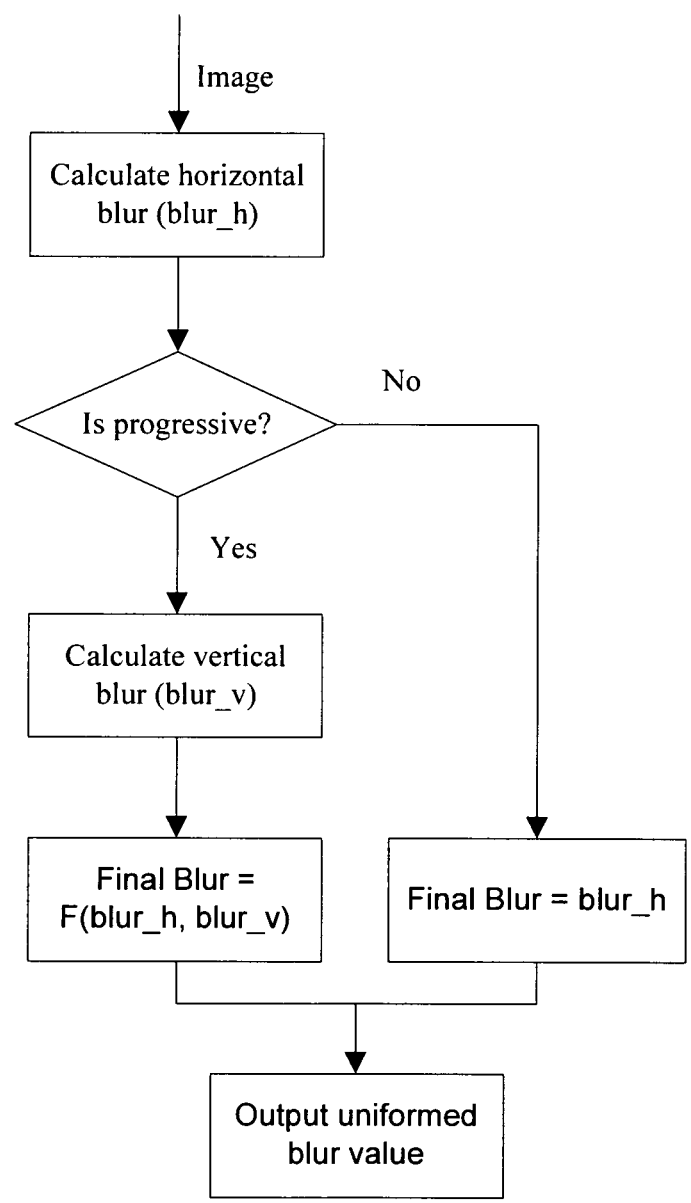
FIG. 2 blur calculation for progressive or interlaced images.

FIG. 2 shows exemplarily a flowchart of the blur detection scheme based on user configuration. It contains three steps:

1. Calculate horizontal blur (blur_h).

This will be illustrated below (refer to FIG. 3).

2. According to user configuration, select an appropriate scheme from a plurality of predefined different schemes.

For progressive images, the vertical blur is calculated and then combined with the horizontal blur to get the final blur. This is because the vertical and horizontal blur calculation has similar performance, and the combination of them can help to get a more stable result. The calculation of vertical blur is done in the same way as that of horizontal blur and is explained in more detail below.

For others (interlaced images or undefined images), the vertical blur is not calculated. Instead, only the horizontal blur is used as the final blur. This is because in interlaced images the top and bottom field may be not aligned, which will largely influence the vertical blur calculation. It is better to only use the horizontal blur as final blur. It has been found that a de-interlacing process still cannot solve the problem, especially for low quality images.

3. Output a uniformed blur value

According to the user configuration, there are four kinds of images: high-res./p, non-high-res./p, high-res/i and non-high-res/i. Lower and upper bounds can be obtained through statistic analysis on a large number of the four kinds of images or from other sources. After the statistic analysis, formula (1) gives the scaling rules, $$UniformedBlur = \begin{cases} 0 & x < c_{min} \\ 100 & x > c_{max} \\ 100 \times (x - c_{min})/(c_{max} - c_{min}) & \text{other} \end{cases} \quad (1)$$

where x is the calculated blur value, $c_{min}$ is the lower bound and $c_{max}$ is the upper bound of the calculated blur value. $c_{min}$ and $c_{max}$ are pre-defined, e.g. as in Tab.1.

Different pairs of $c_{min}$ and $c_{max}$ are for images with different resolution configuration, because for different resolution images the blur detection schemes are different, and the related calculated blur values are in different ranges (see FIG.

3). In one embodiment, they are set experimentally based on analysis of a large amount of images with different resolution.

TABLE 1

Lower and upper bound of final blur value for different kinds of images

| Resolution: | $[C_{min}, C_{max}]$: |
|---|---|
| High resolution | [3, 13] |
| Other | [2, 6] |

It is to be noted that the above embodiment may be modified so that some or all of the characteristic parameters are obtained from a memory after being input through a user interface, through a machine interface from a video decoder or from metadata that are associated with the video images.

Figure 3:
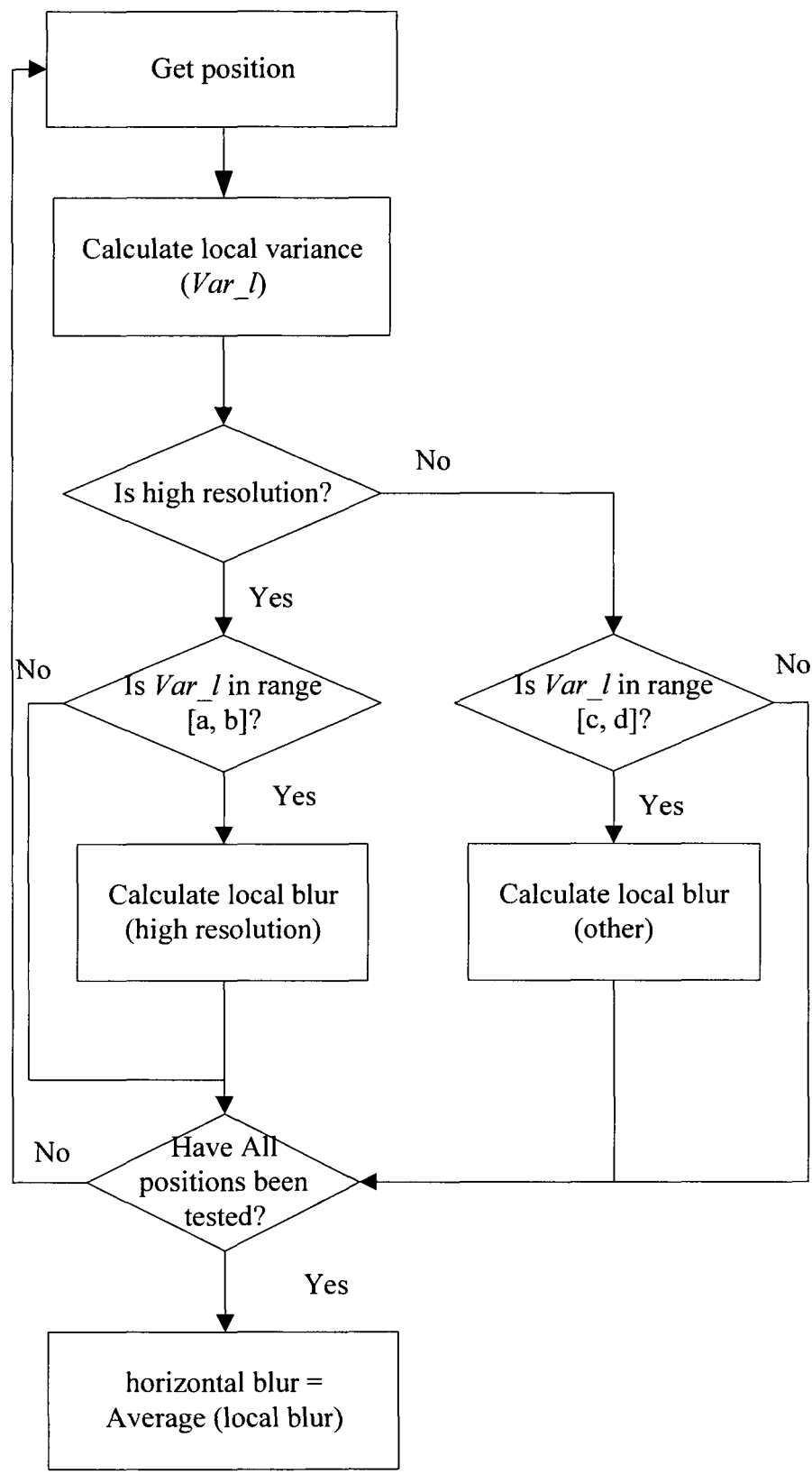
FIG. 3 an exemplary flow chart of horizontal blur calculation.

FIG. 3 shows a flowchart of the horizontal blur calculation. In principle, the vertical blur can be calculated in the same way. It contains following steps:

Step-1: Select a position to calculate local blur

Figure 4:
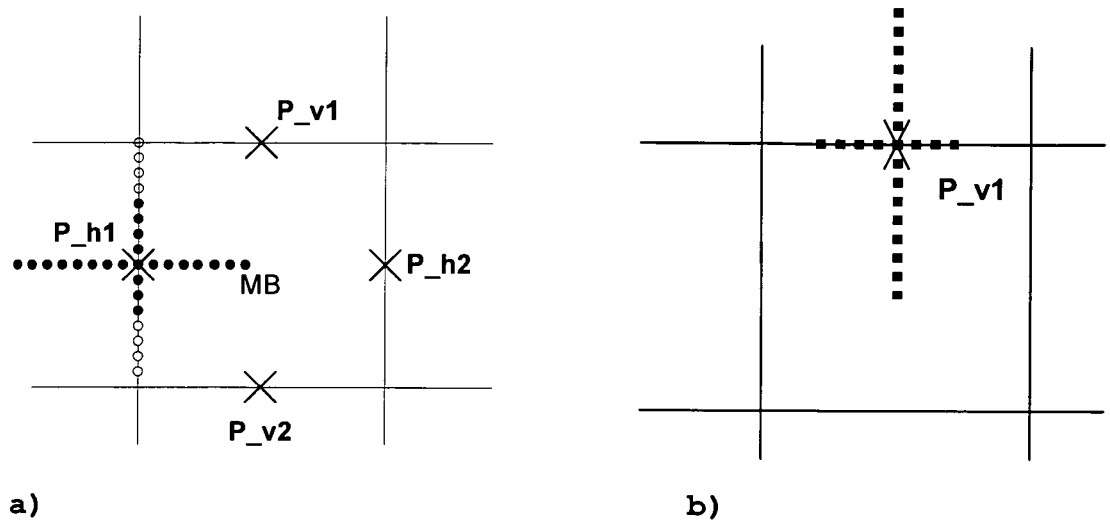
FIG. 4 positions for local blur calculation and regions for local variance calculation.

In the invention, the positions for local blur calculation are set at the centres of macroblocks' (MBs) boundaries. As shown in FIG. 4, P_v1 and P_v2 are the positions for calculating the vertical blur, and are on the centres of the horizontal edges of the MB. P_h1 and P_h2 are on the centres of the vertical edges of the MB, and are the positions for calculating the horizontal blur. Due to the discrete raster of points and the even number of points per MB edge, a position on the "centre" of an edge can be implemented as "next to the actual centre" of an edge. E.g. in a 16×16 MB, the $8^{th}$ or the $9^{th}$ bit of the vertical edge may be used as centre. In the example shown in FIG. 4 a), the $9^{th}$ bit (counting from top) is used. The same counting and same pixel is used in all MBs.

Step-2: Calculate the local variance (Var_l)

As shown in FIG. 4 a), the black cross region with 16 pixels in horizontal direction and 8 pixels in vertical direction around the position p_h1 is the region for the local variance calculation. For vertical local blur calculation, the local variance is calculated in the cross area with 16 pixels in vertical direction and 8 pixels in horizontal direction, as schematically shown in FIG. 4 b).

The formula of the local variance calculation is:

$$\text{Var\_l} = \sqrt{\frac{\sum_{i=1}^{N}(x_i - \bar{x})^2}{N-1}} \quad (2)$$

where N is the number of pixels used (8+16=24 in this example), $x_i$ are the pixels in the black cross region around p_h1 in FIG. 4 a), and $\bar{x}$ is the average value of all $x_i$.

Step-3: Judge if Var_l is in the predefined range

It has been found that the local blur calculation may be highly inaccurate in the regions with too complicated or too plain texture. The range limitation of Var_l can help to exclude those regions. The range can be experientially determined according to the resolution. An example is shown in Tab.2. For example, if the variance calculation for the above-described 24 pixels that are used at a particular MB edge in a high-resolution image results in a value of 20, it is within the range and the MB edge is used. If the variance calculation for the above-described 24 pixels that are used at another MB edge in a high-resolution image results in a value of 34, it is outside the range and the MB edge is not used for blur determination/calculation. In one embodiment, the range for high resolution images has a lower min bound and a lower max bound than the range for other (or unknown) resolution types, as in Tab.2.

TABLE 2

Range of local variance for exclusion

| Resolution type: | Range: |
|---|---|
| High resolution | [a, b] = [1, 30] |
| Other | [c, d] = [2, 40] |

Step-4: Calculate the local blur

Figure 5:
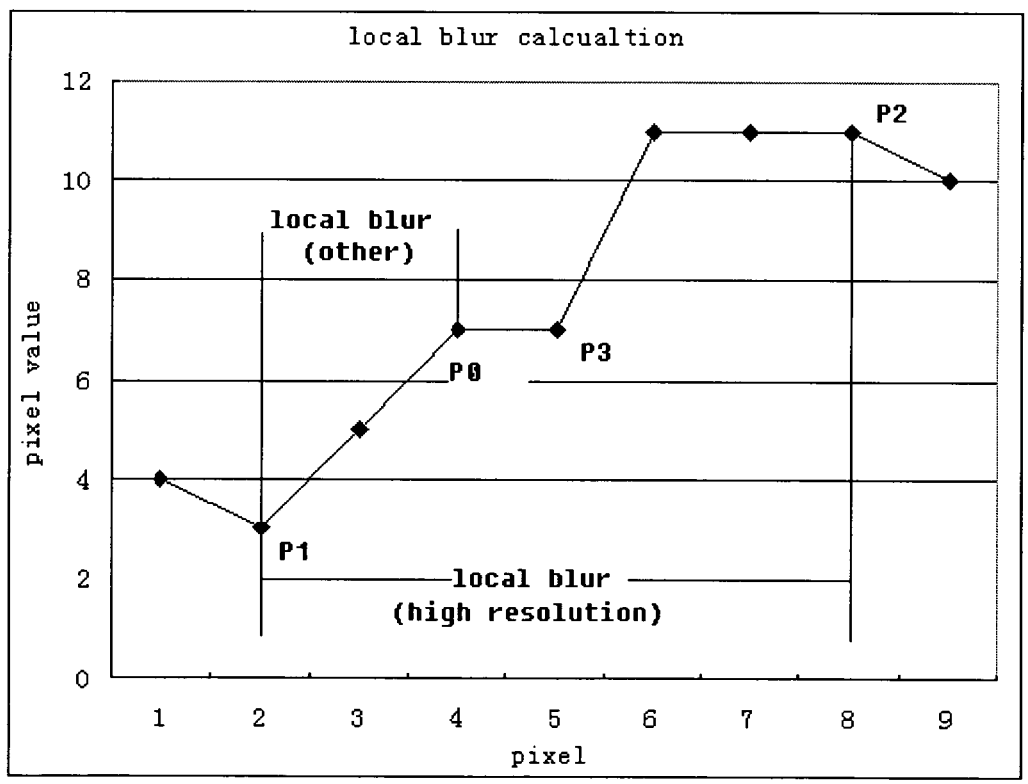
FIG. 5 an example of local blur calculation.

In one embodiment, different calculation methods for local blur are used, depending on the resolution. An example is shown in FIG. 5.

a) High Resolution

The algorithm detects the two pixels with local minimum or maximum luminance values along horizontal direction. The distance between the two pixels is the local blur. In the detection process, pixels with same luminance are included. In FIG. 5, P0 is the position for the local blur calculation, P1 is the pixel with local minimum luminance value, P2 is the pixel with local maximum luminance value, and the local blur value is the spatial distance between P1 and P2 (i.e. six pixels).

b) Other Resolution Types

Different from the scheme for high resolution, pixels that have the same luminance value are excluded in the detection process.

In FIG. 5, P0 is the position for the local blur calculation and P1 is the pixel with local minimum luminance value. Different from the scheme for High resolution, the detection process is stopped at P3, because P0 is the pixel with local maximum luminance value, and P3 is equal to P0. The local blur value is the spatial distance between P1 and P0 (i.e. two pixels).

In another embodiment, only the "high resolution" calculation method is used. In yet another embodiment, only the "other resolution" calculation method is used.

Step-5: Calculate the final horizontal blur value

In this step, all horizontal local blur values whose related Var_l is in the predefined range are averaged in order to get the final horizontal blur. One embodiment comprises averaging by calculating the arithmetic mean all horizontal local blur values whose related Var_l is within the range.

While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention. Although the present invention has been disclosed with regard to video images, one skilled in the art would recognize that the method and devices described herein may be applied to any digital images. It is expressly intended that all combinations of those elements that perform substantially the same function in substantially the same way to achieve the same results are within the scope of the invention. Substitutions of elements from one described embodiment to another are also fully intended and contemplated.

Further, it is to be noted that "uniformed" and "unified" are used equivalently herein.

It will be understood that the present invention has been described purely by way of example, and modifications of detail can be made without departing from the scope of the invention.

Each feature disclosed in the description and (where appropriate) the claims and drawings may be provided independently or in any appropriate combination. Reference numerals appearing in the claims are by way of illustration only and shall have no limiting effect on the scope of the claims.

The invention claimed is:

1. A method for calculating blur of video images, comprising steps of
   calculating a horizontal blur value;
   determining characteristic parameters of the video images, including at least progressive/interlaced and spatial resolution level;
   if the video images are progressive, calculating also a vertical blur value and combining it with the horizontal blur value; and
   normalizing the horizontal blur value, or the combined horizontal and vertical blur value, according to predefined minimum and maximum values, wherein the minimum and maximum values are adapted to the spatial resolution level,
   wherein calculating a blur value comprises calculating a local variance around a current pixel and wherein the current pixel is excluded from blur cancellation if the local variance is above a maximum threshold or below a minimum threshold.

2. Method according to claim 1, wherein calculating a horizontal blur value is performed on image areas around the centers of vertical macroblock edges.

3. Method according to claim 2, wherein the local variance for the horizontal blur value is calculated from pixels on a vertical line and pixels on a horizontal line, wherein more pixels from the horizontal line than from the vertical line are used, and wherein said center of a horizontal macroblock edge is a member of both lines.

4. Method according to claim 1, wherein calculating a vertical blur value is performed on image areas around the centers of horizontal macroblock edges.

5. Method according to 1, wherein one or more of the characteristic parameters of the video images are obtained through a user interface or from a memory after being input through a user interface.

6. Method according to claim 1, wherein one or more of the characteristic parameters of the video images are obtained through a machine interface from a video decoder.

7. Method according to claim 1, wherein one or more of the characteristic parameters of the video images are obtained through metadata associated with the video images.

8. A non-transitory computer program product having stored thereon instructions that when executed on a computer cause the computer to execute a method for calculating blur of video images, the method comprising the steps of:
   calculating a horizontal blur value;
   determining characteristic parameters of the video images, including at least progressive/interlaced and spatial resolution level;
   if the video images are progressive, calculating also a vertical blur value and combining it with the horizontal blur value; and
   normalizing the horizontal blur value, or the combined horizontal and vertical blur value, according to predefined minimum and maximum values, wherein the minimum and maximum values are adapted to the spatial resolution level,
   wherein calculating a blur value comprises calculating a local variance around a current pixel and wherein the current pixel is excluded from blur cancellation if the local variance is above a maximum threshold or below a minimum threshold.

* * * * *